United States Patent [19]
Spreitzer

[11] 3,796,116
[45] Mar. 12, 1974

[54] MACHINE WITH TAILSTOCK

[75] Inventor: Henry W. Spreitzer, Shaker Heights, Ohio

[73] Assignee: The Warner & Swasey Company, Cleveland, Ohio

[22] Filed: Nov. 7, 1972

[21] Appl. No.: 304,408

[52] U.S. Cl............................ 82/2 R, 82/31, 29/47
[51] Int. Cl......................... B23b 23/00, B23b 7/04
[58] Field of Search.......... 82/2, 2.5, 2.7, 31; 29/39, 29/40, 41, 42, 43, 44, 46

[56] References Cited
UNITED STATES PATENTS

| | | | |
|---|---|---|---|
| 2,071,201 | 2/1937 | Frech...................................... | 29/27 |
| 2,392,186 | 1/1946 | Pierle..................................... | 82/31 |
| 2,653,503 | 9/1953 | Cormier.................................. | 82/31 |
| 3,731,564 | 5/1973 | Diener et al............................. | 82/31 |

Primary Examiner—Leonidas Vlachos
Assistant Examiner—W. R. Briggs

[57] ABSTRACT

An improved machine tool includes a tailstock having a center assembly which is movable between operating and retracted positions by a piston and cylinder assembly. When the center assembly is in the operating position, a main axis of the center assembly is aligned with the axis of rotation of a workpiece. In the retracted position, the center assembly is offset to one side of the workpiece. When the center assembly is in the operating position, a tailstock motor is activated to press the center assembly against the outer end of the workpiece to thereby support the workpiece in a known manner. A control system coordinates movement of the center assembly with movement of a turret to avoid interference between the tailstock and tools mounted on the turret.

17 Claims, 7 Drawing Figures

MACHINE WITH TAILSTOCK

BACKGROUND OF THE INVENTION

The present invention relates to a machine tool having a tailstock center assembly which can be moved between an operating position in which it is aligned with the axis of rotation of a workpiece and a retracted position in which the center assembly is offset to one side of the axis of the workpiece.

There are many types of lathes and other machine tools having tailstocks with center assemblies to support the outer end portion of a workpiece as it is rotated by a spindle. Some of these tailstocks have been provided with fluid motors to press the center assemblies against a workpiece in the manner disclosed in U. S. Pat. No. 3,581,611. The tailstocks of other machine tools have been provided with center assemblies which can be manually moved between an operating position and a retracted position in which the center assemblies are offset to one side of the operating position (see U. S. Pat. Nos. 2,071,201 and 2,392,186).

Although these prior art patents disclose machine tools having manually movable tailstock center assemblies, these machine tools must be shut down for a substantial period of time whenever a tailstock center assembly is to be moved from an operating position to a retracted position in which the center assembly is offset to one side of a workpiece. The known center assemblies which are manually movable between the operating and retracted positions have not heretofore been equipped with fluid motors to press the center assemblies against a workpiece. In addition, these known machine tools do not contemplate the use of controls to coordinate movement of a tailstock center assembly with movement of a turret to prevent interference between tools mounted on the turret and the tailstock.

SUMMARY OF THE PRESENT INVENTION

The present invention provides a machine tool having a tailstock center assembly which is movable between an operating position in which the center assembly is axially aligned with the axis of rotation of a workpiece and a retracted position in which the center assembly is offset to one side of the axis of rotation of the workpiece. A fluid motor assembly is associated with the center assembly and presses it against the end of a workpiece with a predetermined force when the center assembly is in the operating position. A control system effects operation of this fluid motor to move the center assembly out of engagement with the workpiece prior to movement of the center assembly from the operating position to the retracted position. The control system also coordinates movement of the center assembly with movement of a machine tool turret to prevent interference between the tailstock and tools mounted on the turret.

Accordingly, it is an object of this invention to provide a new and improved machine tool having a tailstock with a drive mechanism for moving a center assembly between an operating position in which the center assembly is axially aligned with the axis of rotation of a workpiece and a retracted position in which the center assembly is offset to one side of the axis of rotation of the workpiece.

Another object of this invention is to provide a new and improved machine tool as set forth in the next preceding object and wherein a control system is provided to effect the operation of the drive mechanism to move the center assembly between the operating and retracted positions in a predetermined sequential relationship with movement of a turret which holds tools for operating on a workpiece.

Another object of this invention is to provide a new and improved machine tool having a tailstock for supporting one end portion of a workpiece as it is rotated by a spindle and wherein the tailstock includes a carriage which is movable toward and away from the spindle, a center assembly for engaging one end portion of the workpiece, and a piston and cylinder assembly for moving the center assembly between an operating position in which it is aligned with the axis of rotation of the workpiece and a retracted position in which the center assembly is offset to one side of the axis of rotation of a workpiece.

Another object of this invention is to provide a new and improved machine tool as set forth in any of the preceding objects and wherein the tailstock further includes a motor for pressing the center assembly against the workpiece when the center assembly is in the operating position.

BRIEF DESCRIPTION OF THE DRAWINGS

The foregoing and other objects and features of the present invention will become more apparent upon a consideration of the following description taken in connection with the accompanying drawings wherein.

DESCRIPTION OF ONE SPECIFIC PREFERRED EMBODIMENT OF THE INVENTION

A machine tool 10 (FIG. 1) constructed in accordance with the present invention includes a tailstock 12 having a center assembly 14 disposed in a head 16. The head 16 and center assembly 14 are movable from the operating position of FIGS. 2 and 3 to the retracted position FIG. 4. When the center assembly 14 is in the operating position, a main axis 18 (FIG. 2) of the center assembly is aligned with the axis of rotation of a spindle 20 and workpiece 22. The center assembly is pressed against the outer end portion of the axially aligned workpiece 22 with a predetermined force by a hydraulic motor 26 disposed in the head 16.

Figure 3:
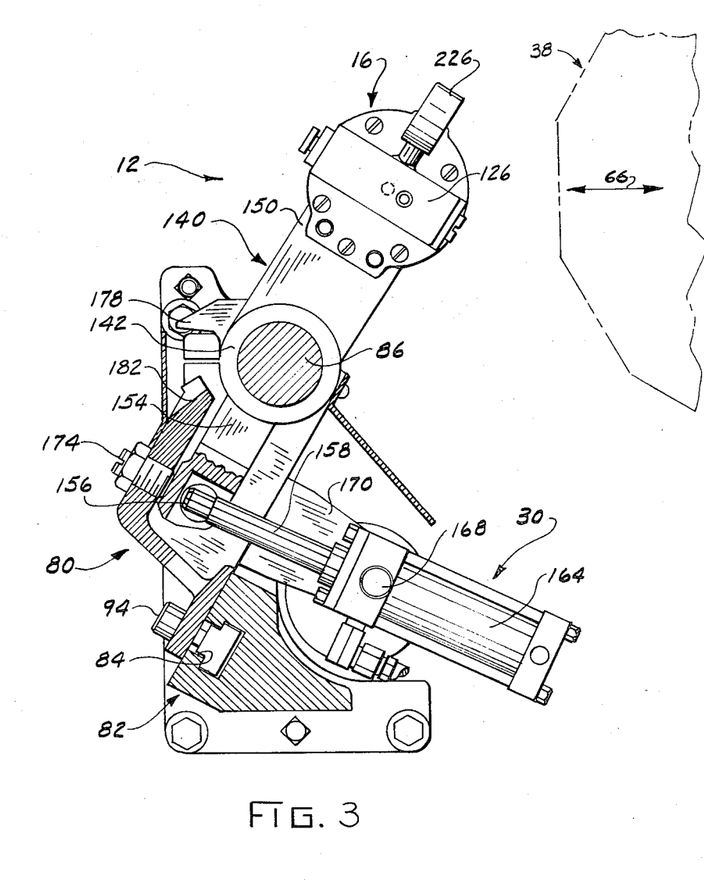
FIG. 3 is an enlarged sectional view, taken generally along line 3—3 of FIG. 1, illustrating the tailstock in an operating position in which a center assembly is disposed in axial alignment with the axis of rotation of a workpiece.
Figure 4:
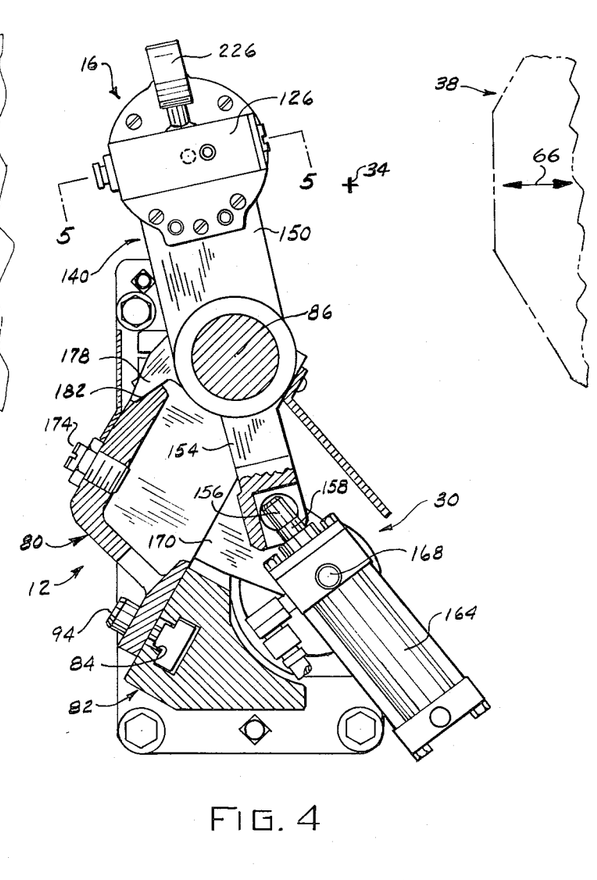
FIG. 4 is a sectional view similar to FIG. 3, illustrating the tailstock in retracted position in which the center assembly is offset to one side of the axis of the workpiece.

When the center assembly 14 is to be moved to the retracted position of FIG. 4, the hydraulic motor 26 is operated to move the center assembly out of engagement with the end of the workpiece 22. A piston and cylinder assembly 30 (FIG. 3) is then activated to move the center assembly 14 from the operating position to the retracted position (FIG. 4). When the center assembly 14 is in the retracted position, a turret 38 of the machine tool (FIG. 1) can be moved relative to the spindle 20 and workpiece 22 with a relatively small chance of interference between the tailstock 12 and tools 40 mounted on the turret. Movement of the center assembly 14 and turret 38 is effected in a desired operating sequence by a control system 46.

Figure 1:
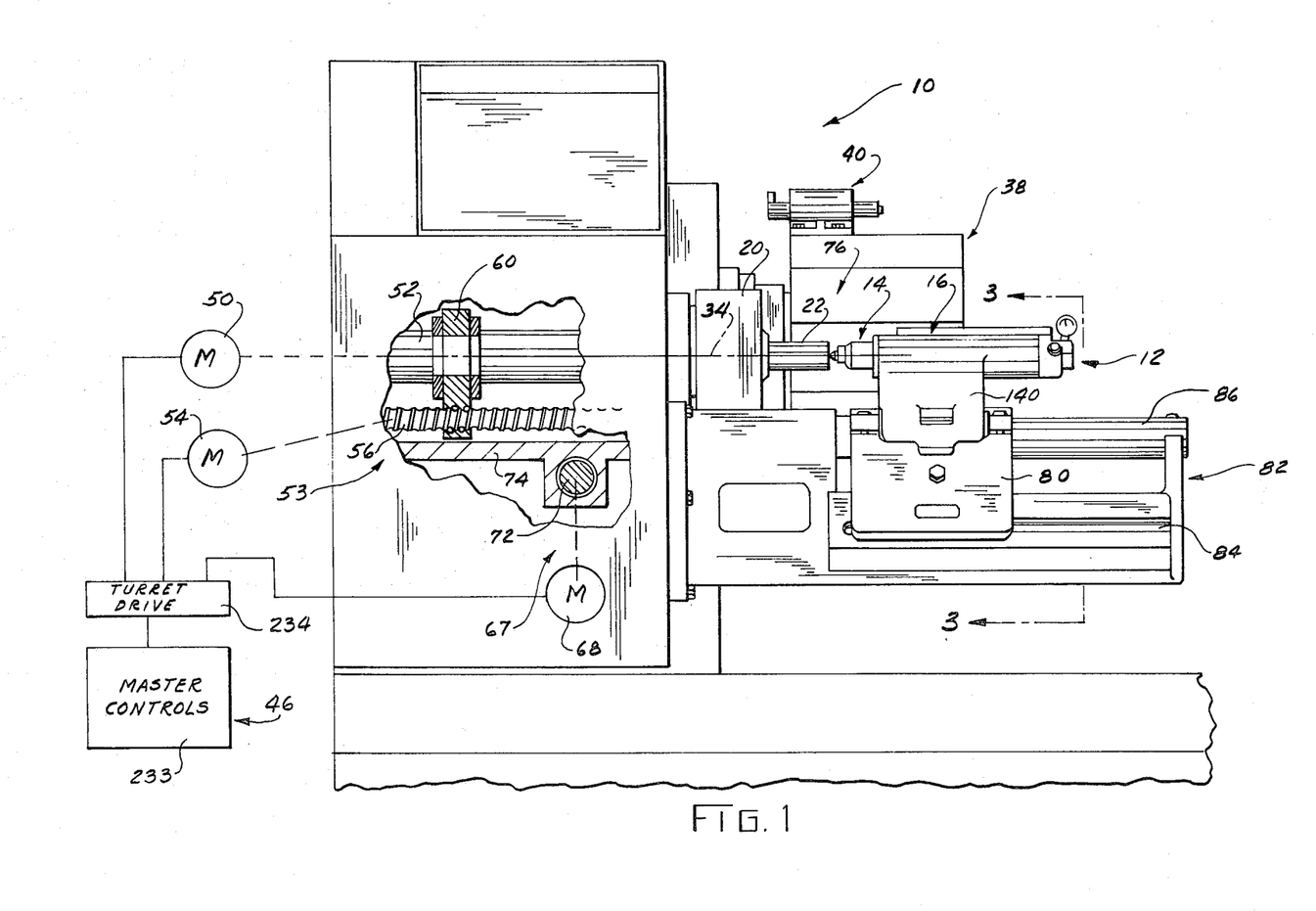
FIG. 1 is a partially broken away schematic illustra of a machine tool having a movable tailstock.

The turret 38 can be rotated about its central axis to move a selected one of a plurality of tools 40 (only one of which is shown in FIG. 1) from an inactive position to a working position. To effect this rotational movement of the turret 38, a turret indexing or drive motor 50 is connected by a suitable indexing mechanism (not shown) with a turret bar or shaft 52. Upon operation of the motor 50, the turret bar 52 is rotated about its central axis to rotate the turret 38 relative to the workpiece 22. It should be noted that the central axis of the turret 38 is parallel to both the axis of rotation 34 of the spindle 20 and the main axis of the center assembly 14. This parallel relationship is maintained during movement of the center assembly 14 between the operating and retracting positions.

The turret 38 can be moved through longitudinal strokes parallel to the axis of rotation of the workpiece 22 by a drive assembly 53. The drive assembly 53 includes a motor 54 which is operable to rotate a lead screw 56. Rotation of the lead screw 56 moves a nut 60 connected to the turret bar 52. This movement of the nut 60 moves the turret 38 and tools 40 through longitudinal strokes in a known manner.

The turret 38 can be moved through cross strokes (that is in the direction of the arrow 66 FIGS. 3 and 4) by a drive assembly 67. The drive assembly 67 includes a motor 68 which is operable to rotate a drive screw 72 connected to a turret carrier 74 upon which the lead screw 56 and turret bar 52 are mounted. The construction of the various drive mechanism for indexing the turret 38 and moving the turret through longitudinal and cross strokes are more fully described in U. S. application Ser. No. 148,729, filed June 1, 1971 by Baxter T. Fullerton and entitled "Machine Tool". Although the movable tailstock 12 is particularly advantageous in association with a turret which can be indexed and moved through both cross and longitudinal strokes, it is contemplated that the movable tailstock may be utilized with turrets which can be moved through operating strokes along only one axis.

When the length of the portion of the workpiece 22 extending into a work area 76 is changed, it is necessary to adjust the distance between the center assembly 14 and spindle 20. Accordingly, the tailstock 12 includes a movable carriage 80 which is slidably disposed on a cantilevered base section 82 (FIG. 1). Guideways 84 are provided on the base section 82 to guide movement of the carriage 80 toward and away from the spindle 20 along a path extending parallel to the spindle axis 34. A support bar 86 extends parallel to the guideway 84 and spindle axis 34 and engages an upper end portion of the carriage 80 to further guide movement of the carriage.

Figure 2:
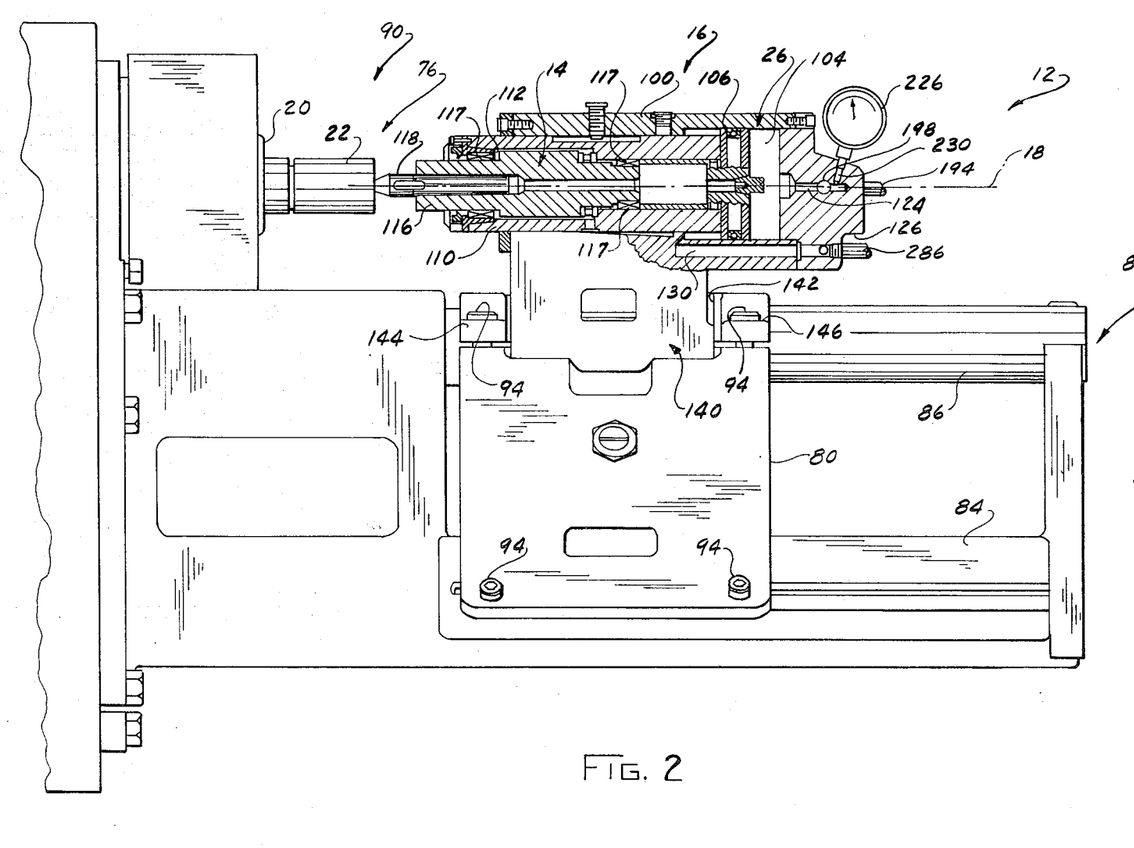
FIG. 2 is an enlarged sectional view of a center assembly and fluid motor in the tailstock of the machine tool of FIG. 1.

When the length of the portion of the workpiece 22 disposed in the work area 76 (see FIG. 2) is to be increased, bolts 94 are loosened and the carriage 80 is moved away from the spindle 20 (that is toward the right as viewed in FIG. 2). Of course, this increases the distance between the center assembly 14 and the spindle 20 to enable a relatively long portion of the workpiece 22 to be accommodated in the work area 76. When the carriage 80 has been moved through a sufficient distance away from the spindle 20, the bolts 94 are tightened to securely clamp the carriage against further movement. It should be noted that both the center assembly 14 and piston and cylinder assembly 30 (see FIGS. 3 and 4) are mounted on the carriage 80 and are moved with the carriage toward and away from the spindle 20.

When the tailstock 12 is positioned relative to the outer end portion of the workpiece 22 by movement of the carriage 80 along the cantilevered support section 82, the tailstock is located with the center assembly 14 slightly outwardly (that is toward the right as viewed in FIG. 2) of the end surface of the workpiece 22. By positioning the tailstock 12 with the center assembly 14 spaced slightly from the end of the workpiece 22, the center assembly can be moved between the retracted position of FIG. 4 and operating position of FIG. 3 without interfering with the workpiece. Once the center assembly 14 has been moved to the operating position of FIG. 3 by the piston cylinder assembly 30, the hydraulic motor 26 (FIG. 2) is activated to move the center assembly 14 inwardly (toward the left as viewed in FIG. 2) into pressure engagement with the end of the workpiece 22.

The hydraulic motor 26 includes a cylinder 100 having a cylindrical operating chamber 104 in which a piston 106 is slidably disposed. The piston 106 is provided with a longitudinally extending rod section 110 which defines a generally cylindrical cavity 112 in which the center assembly 114 is disposed. The center assembly 114 is of the "live" type and includes a support section 116 which is rotatably mounted on bearings 117 disposed between the rod section 110 and the support section 116. The center or quill 118 is mounted in the support section 116 in a known manner.

When the center assembly 14 is moved to the operating position of FIG. 3, the motor 26 is activated to press the center assembly 14 against the end of the workpiece 22. To this end, fluid under pressure is conducted through a passage 124 (FIG. 2) to move the piston 106 from a position closely adjacent the cylinder head 126 to the actuated position shown in FIG. 2. This movement of the piston 106 presses the quill 118 against the outer end of the workpiece 22. The center assembly 14 then engages and supports the outer end portion of the workpiece 22 in a known manner as the workpiece is rotated by the spindle 20.

When the center assembly 14 is to be moved from the operating position to the retracted position to facilitate operating on the end of the workpiece 22 with tools mounted on the turret 38, the motor 26 is operated to move the center assembly out of engagement with the workpiece. Thus, fluid under pressure is conducted through a passage 130 (FIG. 2) to the rod end of the chamber 104 to move the piston 106 outwardly (that is toward the right as viewed in FIG. 2). This outward movement of the piston 106 moves the center assembly 14 out of engagement with the end of the workpiece 22. The center assembly 14 can then be moved from the operating position to the retracted position.

To effect movement of the center assembly 14 from the operating position to the retracted position, the piston and cylinder assembly 30 is operated to pivot a support arm or lever 140 in a counter-clockwise direction about the shaft 86 from the position shown in FIG. 3 to the position shown in FIG. 4. The support arm 140 extends perpendicular to the support shaft 86 and includes a bearing section 142 which slidably engages the support shaft. The bearing section 142 is trapped between sections 144 and 146 (FIG. 2) of the carriage 80 so that the support arm 140 is moved along the shaft 86 with the carriage. An upward end portion 150 of the support arm 140 is fixedly connected with the head 16 while a lower end portion 154 of the support arm is pivotally connected at 156 with a piston rod 158 of the piston cylinder assembly 30.

Upon operation of the piston and cylinder assembly 30 from the extended position of FIG. 3 to the retracted position of FIG. 4, the support arm 140 is pivoted in a counterclockwise direction about the support shaft 86 to move the center assembly 14 into a transversely offset relationship with the workpiece 22. It should be noted that although the central or main axis 18 of the center assembly 14 is offset transversely to one side of the axis 34 of the workpiece 22 and spindle 20, the axis 18 of the center assembly remains parallel to the spindle axis 34. By maintaining this parallel relationship, the center assembly 14 can be moved back to the operating position by merely extending the piston and cylinder assembly 30 to move the head 16 along an arc extending perpendicular to the axis of rotation 34 of the workpiece 22.

The piston and cylinder assembly 30 includes a cylinder 164 which is pivotally connected at 168 with a support arm 170 of the carriage 80. This pivotal connection between the cylinder 164 and carriage 80 enables the cylinder to pivot in a clockwise direction (as viewed in FIG. 3) as the piston cylinder assembly is retracted to swing the support arm 140 in a counter-clockwise direction above the shaft 86. Although in an illustrated embodiment of the invention it is preferred to move the center assembly 14 along an arcuate path between the operating position of FIG. 3 and the retracted position of FIG. 4, it is contemplated that under certain conditions it may be advantageous to mount the piston cylinder assembly 30 so as to move the center assembly 14 along a linear path between the operating and retracted positions.

As the center assembly 14 moves into the operating position under the influence of the piston and cylinder assembly 30, the lower end portion 154 of the support arm engages a stop screw 174. The stop screw 174 interrupts movement of the support arm 140 when the center assembly 14 reaches the operating position of FIG. 3. The stop screw 174 is adjustable to enable the center assembly to be positioned with its main axis 18 in precise alignment with the axis of rotation of the workpiece 22 and spindle 20. Similarly, a stop lug 178 extends transversely outwardly from the support arm 140 and engages a stop surface 182 on the carriage 80 (see FIG. 4) when the center assembly 14 is in the retracted position of FIG. 4.

Figure 5:
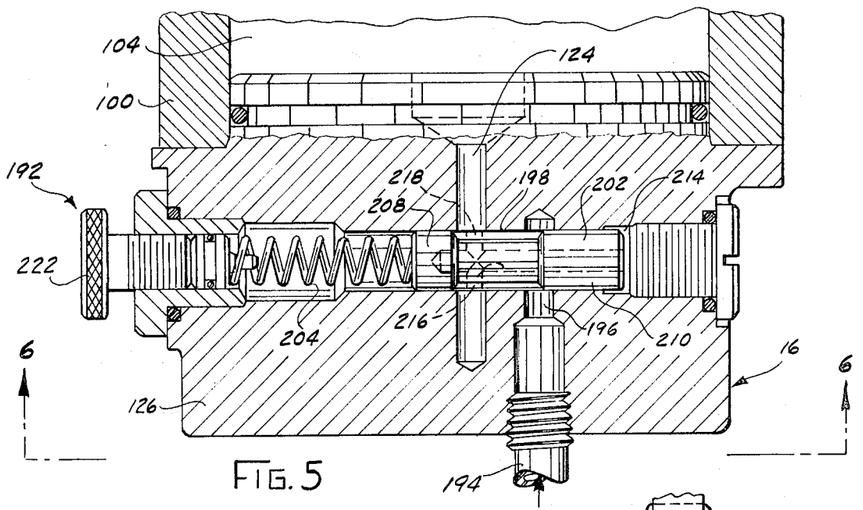
FIG. 5 is an enlarged fragmentary sectional view, taken generally along the line 5—5 of FIG. 4, illustrating a pressure regulator valve for controlling fluid pressure conducted to the fluid motor in the tailstock.

During operation of the machine tool 10 the motor 26 presses the center assembly 14 against the outer end portion of the workpiece 24 with a constant force which is controlled by a pressure regulator assembly 192 (see FIG. 5). The pressure regulator assembly 192 is disposed in the cylinder head 16 and is connected in fluid communication with a pump or other fluid under pressure through a conduit 194 when the motor 26 is being operated to press the center assembly 14 against the end of the workpiece 22. The conduit 194 is connected by a passage 196 with a valve chamber 198. The valve chamber 198 is in turn connected with the motor chamber 104 by the passage 124.

To control the pressure transmitted from the passage 196 to the motor chamber 104, a spool type valve element 202 is disposed in the valve chamber 198 and is biased toward the open position (shown in FIG. 5) under the influence of a spring 204. The fluid pressure in the valve chamber 198 between lands 208 and 210 of the valve spool 202 is conducted to a pressure chamber 214 through internal passages 216 and 218. The pressure in the chamber 218 presses the valve spool 202 toward the left (as viewed in FIG. 5) against the influence of the spring 204. When the pressure in the chamber 214 exceeds the force exerted on the valve spool 202 by the spring 204, the valve spool will move to block the passage 196 with the valve land 210. Of course, the pressure in the valve chamber 198 and pressure chamber 214 is communicated by the passage 124 to the motor chamber 104. Therefore, the force applied by the motor 26 against the center assembly 14 varies as a function of the fluid pressure in the valve chamber 198 and pressure chamber 214.

To enable the force with which the motor 26 presses the center assembly 14 against the end of the workpiece 22 to be adjusted, a manually rotatable screw 222 can be turned to either increase or decrease the force which the spring 204 applies against the valve spool 202. Thus to increase the force with which the motor 26 presses the center assembly 14 against the workpiece 22, the screw 222 is turned inwardly toward the valve spool 202 to increase the force which is applied by the spring 204 against the valve spool 202. Similarly, if the force with which the center assembly 14 engages the workpiece 22 is to be decreased, the screw 222 is turned outwardly to thereby relax the spring 204 and decrease the pressure which is applied against the valve spool 202. A pressure gauge 226 (see FIGS. 2 and 6) is connected with the valve chamber 198 through a passage 230 (FIG. 2) and provides an indication of the magnitude of the force applied by the motor 26 against the center assembly 14.

During operation of the machine tool 10, the control system 46 coordinates movement of the turret 38 and center assembly 14 to avoid interference between tools 40 on the turret 38 and the tailstock 12. The control system 46 includes a tape reader 230 which reads a program punched into a tape 232 and activates master controls 233 to operate turret drive controls 234 (FIG. 1) to energize the turret motors 50, 54 and 68. In addition, the master controls 233 are connected with a valve 238 (FIG. 7) which controls operation of the piston and cylinder assembly 30.

Figures 6, 7:
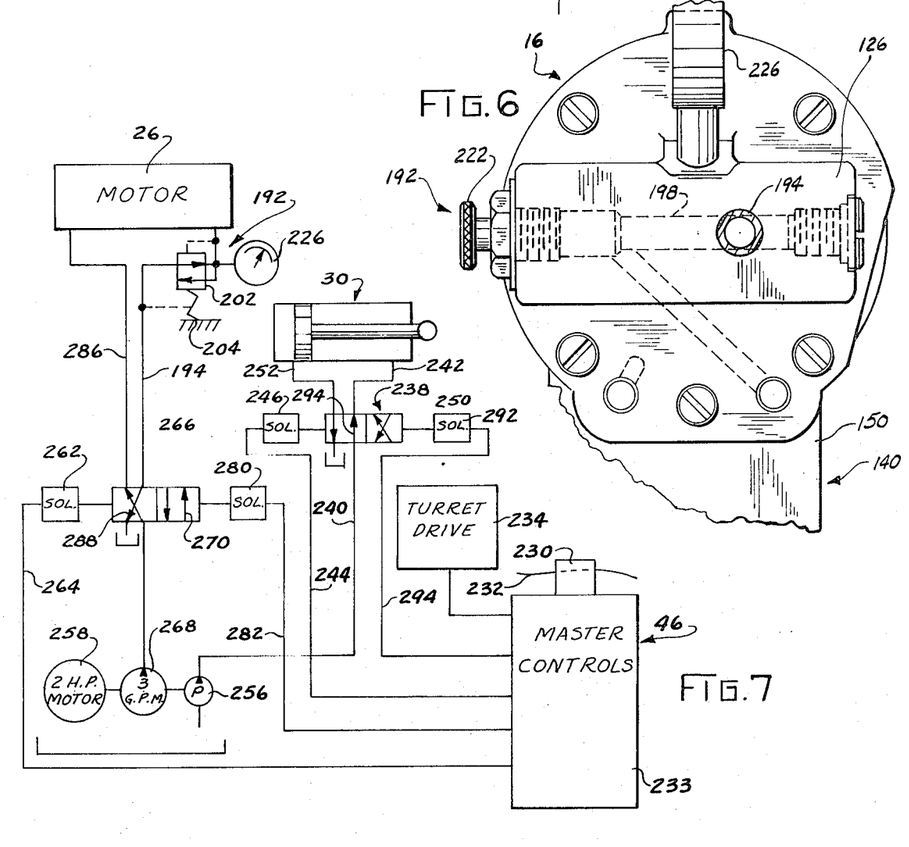
FIG. 6 is an elevational view, taken generally along the line 6—6 of FIG. 5, illustrating the relationship of a drain passage to the pressure regulator valve.
FIG. 7 is a schematic illustration of a control system for the machine tool of FIG. 1.

When the valve 238 is in the initial position shown in FIG. 7, fluid under pressure is conducted through conduits 240 and 242 to the piston and cylinder assembly 30. This fluid pressure causes the piston and cylinder assembly 30 to hold the center assembly 14 in the retracted position of FIG. 4.

When the center assembly 14 is to be moved to the operating position and the turret 38 has been moved out of the way in accordance with the program punched on the tape 232, the tape reader 230 activates the master controls 233 to operate the piston and cylinder assembly 30. To this end, the master controls 233 transmit a signal over a lead 244 to activate a solenoid 246 and operate the valve 238 from the initial position shown in FIG. 7 to operating position. This enables fluid under pressure to be conducted from conduit 240 through a passage 250 in the valve 238 to a conduit 252 leading to the head end of the piston and cylinder assembly 30. This causes the piston and cylinder assembly 30 to be extended to move the center assembly 14 from the retracted position of FIG. 4 toward the operating position of FIG. 3. When the center assembly 14 reaches the operating position of FIG. 3, the stop member 174 will interrupt movement of the support arm 140. Fluid pressure from a pump 256 driven by motor 158 (FIG. 7) will then bias piston and cylinder assembly 30 to hold the tailstock in the operating position.

Once the center assembly 14 has been moved from the retracted position to the operating position, it is necessary to operate the motor 26 to bring the quill 118 into engagement with the end of the workpiece 22. Accordingly, after the center assembly 14 has been moved to the operating position, the tape 232 is read by the reader 230 to activate the master controls 233 to operate the motor 26. The master controls 233 effect operation of the motor 26 by energizing a solenoid 262 over a lead 264. Energization of the solenoid 262 operates a motor control valve 266 to transmit fluid pressure from a second pump 268 through an internal valve passage 270 and conduit 194 to the pressure regulator assembly 192 and the operating chamber 104 of the motor 26. This causes the piston 106 to move toward the left (as viewed in FIG. 2) to press the center assembly 14 against the outer end of the workpiece 22 with a pressure determined by the setting of the pressure regulator screw 222 (see FIG. 5). During subsequent operation of the machine tool 10, the tailstock 20 supports the outer end of the workpiece 22 as it is being worked on by tools mounted on the turret 38. In accordance with well known practices, movements of the turret 38 are controlled by the master controls 233 in accordance with a program on the tape 232.

When machine operations which require supporting of the workpiece 22 by the tailstock 12 have been completed, the center assembly 14 is moved from the operating position to the retracted position. However, before the center assembly 14 can be moved relative to the workpiece 22, it is necessary to operate the motor 26 to move the quill 118 out off engagement with the end of the workpiece 22. Thus, immediately before the center assembly 14 is to be moved to the retracted position, the tape reader 230 indexes the tape 232 and transmits a signal to the master controls 233 to effect energization of a solenoid 280 over lead 282 to thereby return the motor control valve 266 to the position illustrated in FIG. 7. This causes high pressure fluid to be transported from the pump 268 through a conduit 286 to the passage 130 (FIG. 2) leading to the rod end of the motor 26. At the same time, the head end of the motor 26 is connected with drain through an internal passage 288 in the valve 266. This causes the piston 106 to move toward the right (as viewed in FIG. 2) to move the center assembly 14 away from the workpiece 22.

When the quill 118 has been moved clear of the end of the workpiece 22, the piston and cylinder assembly 30 may be operated to swing the center assembly 14 from the operating position to the retracted position. Accordingly, once the motor 26 has been fully retracted, the reader 230 against indexes the tape 232 and activates the master controls 233 to energize a solenoid 292. This operates the valve 238 to the position shown in FIG. 7 so that fluid under pressure is ported through an internal passage 294 to the conduit 242 to cause the piston and cylinder assembly 30 to be retracted from the extended position of FIG. 3. As the piston and cylinder assembly 30 is retracted, the support arm 140 is pivoted in a counter-clockwise direction (as viewed in FIG. 3) about the support shaft 86. This counter-clockwise movement of the support arm 140 moves the center assembly 14 from the operating position to the retracted position in the manner previously explained.

In view of the foregoing description, it can be seen that the machine tool 10 includes a tailstock 12 having a center assembly 14. The center assembly 14 is movable between a retracted position in which the central axis 18 of the center assembly is offset from and parallel to the axis of rotation of the spindle 20 and workpiece 22 and an operating position in which the axis 18 is axially aligned or coincident with the axis 34 of rotation of the spindle 20. The center assembly 14 is moved between the retracted and operating positions by a piston and cylinder assembly 30. The control system 46 coordinates the operation of the piston and cylinder assembly 30 with movement of the turret 38 to prevent interference between tools 40 mounted on the turret and the tailstock 12.

When the center assembly 14 is in the operating position, a fluid motor 26 is activated to press a quill 118 against one end of the workpiece 22. The pressure regulator 192 is associated with the motor 26 so that it is effective to press the quill 118 against the end of the workpiece with a constant force during rotation of the workpiece 22 by the spindle 20. Before the center assembly is moved from the operating position to the retracted position, the motor 26 is operated to move the quill 118 out of engagement with the end of the workpiece 22.

Although the tailstock 12 has been illustrated herein in association with a machine tool constructed in a manner disclosed in the aforementioned Fullerton application Ser. No. 148,729, filed June 1, 1971 and entitled "Machine Tool", it is contemplated that the tailstock could be associated with other type of machine tools. For example, the tailstock might be used with the machine tool disclosed in U. S. Pat. No. 2,644,222. In addition, it is contemplated that under certain conditions a motor may be associated with the tailstock carriage 80 to move the tailstock toward and away from the spindle 20.

Having described one specific preferred embodiment of the invention, the following is claimed:

1. A machine tool comprising spindle means for holding a workpiece with one end portion of the workpiece extending into a work area and for rotating the workpiece about its central axis, turret means for holding a plurality of tools, turret drive means for moving said turret means relative to said spindle means to position a selected one of the tools relative to the workpiece, tailstock means for supporting the one end portion of the workpiece, said tailstock means including center means for engaging the one end portion of the workpiece, means supporting said center means for movement along a path extending transversely to the central axis of workpiece, and tailstock drive means for moving center means along the path between an operating position in which said center means has a main axis aligned with the central axis of the workpiece and a retracted position in which said center means is spaced from the workpiece and is disposed with its main axis extending parallel to and transversely offset from the central axis of the workpiece, and control means for controlling operation of said turret drive means and said tailstock drive means to effect movement of said center means between the operating and retracted possitions in a predetermined sequential relationship with the movement of said turret means.

2. An apparatus as set forth in claim 1 wherein said tailstock means includes a carriage movable toward and away from said spindle means along a path extending parallel to the central axis of the workpiece, and piston and cylinder means connected with said carriage means and said center means for effecting movement of said center means along the path extending transversely to the central axis of the workpiece.

3. A machine tool as set forth in claim 1 where said tailstock means includes motor means for pressing said center means against the one end portion of the workpiece with a predetermined force.

4. A machine tool as set forth in claim 1 wherein said turret drive means includes indexing means for rotating said turret means about an axis extending parallel to the central axis of the workpiece to move one tool mounted on said turret means away from a working position and to move another tool mounted on said turret means toward the working position.

5. A machine tool as set forth in claim 4 wherein said turret drive means further includes means for moving said turret means toward and away from the workpiece along a path extending transversely to the axis of rotation of said turret means and the central axis of the workpiece.

6. A machine tool as set forth in claim 1 wherein said tailstock means further includes motor means for pressing said center means against the one end portion of the workpiece, said tailstock drive means being operable to move said center means and said motor means together along the path extending transversely to the central axis of the workpiece.

7. A machine tool as set forth in claim 6 wherein said control means includes means for rendering said motor means effective to press said center means against the one end portion of the workpiece when said center means is in the operating position and for rendering said motor means effective to move said center means out of engagement with the one end position of the workpiece prior to movement of said center means from the operating position to the retracted position.

8. A machine tool comprising spindle means for holding a workpiece with one end portion extending into a work area and for rotating the workpiece about its central axis, tailstock means for supporting the one end portion of the workpiece, said tailstock means including a carriage movable toward and away from said spindle means along a first path extending parallel to the central axis of the workpiece, center means for engaging the one end portion of the workpiece, support means connected with said carriage and center means for supporting said center means for movement relative to said carriage along a second path extending transversely to the first path and the central axis of the workpiece, and piston and cylinder means connected with said carriage and said support means for effecting movement of said center means along the second path between an operating position in which a main axis of said center means is aligned with the central axis of the workpiece and a retracted position in which said center means is spaced from the workpiece with the main axis of said center means offset from the central axis of the workpiece.

9. A machine tool as set forth in claim 8 wherein said tailstock means further includes motor means for pressing said center means against the one end portion of the workpiece when said center means is in the operating position, said piston and cylinder means being operable to move said motor means along the second path with said center means upon movement of said center means between the operating and retracted positions.

10. A machine tool as set forth in claim 9 wherein said second path has an arcuate configuration and said support means includes means for supporting said center means and said motor means for pivotal movement about an axis extending parallel to the central axis of the workpiece.

11. A machine tool as set forth in claim 10 further including means for supporting said piston and cylinder means for rotational movement relative to the carriage about an axis extending parallel to the central axis of the workpiece.

12. A machine tool as set forth in claim 10 further including stop means for stopping pivotal movement of said center means and motor means by said piston and cylinder means when said center means reaches the operating position during movement of said center means from the retracted position to the operating position.

13. A machine tool as set forth in claim 9 wherein said motor means includes a hydraulic motor connected with said center means, said machine tool further including conduit means for conducting fluid under pressure to said hydraulic motor to activate said hydraulic motor to press said center means against the one end portion of the workpiece, pressure regulator means for controlling the fluid pressure conducted to said motor means to thereby control the pressure with which said motor means presses said center means against the one end portion of the workpiece, and valve means for controlling fluid flow to and from said motor means.

14. A machine tool comprising a base, spindle means connected with said base for holding a workpiece with one end portion of the workpiece extending into a work area and for rotating the workpiece about its central axis, turret means connected with said base for holding a plurality of tools, turret drive means for moving said turret means relative to said spindle means to position a selected one of the tools relative to the workpiece, guide means connected with said base and defining a first path extending parallel to the central axis of the workpiece, a tailstock means for supporting the one end portion of the workpiece, said tailstock means including carriage means connected with said guide means and movable toward and away from said spindle means along said first path to position said tailstock means at a desired distance from said spindle means, center means for engaging the one end portion of the workpiece, support means for supporting said center means for movement relative to said carriage means along a second path extending transversely to said first path and the central axis of the workpiece, piston and cylinder means connected with said carriage means and said support means for moving said center means along the second path between an operating position in which said center means is disposed with a main axis in alignment with the central axis of the workpiece and a retracted position in which the main axis of said center means is transversely offset from and extends parallel to the central axis of the workpiece, and motor means movable with said center means between the operating and retracted positions for moving said center means relative to said support means between a first position in which said center means is spaced from one end portion of the workpiece when said center means is in the operating position and a second position in which said center means is disposed in engagement with one end portion of the workpiece when said center means is in the operating position and for pressing said center means against the workpiece when said center means is in the second position, and control means for controlling the operation of said turret drive means, piston and cylinder means, and motor means to effect movement of said turret and center means in a desired sequence, said control means including means for effecting operation of said motor means to move said center means from the second position to the first position prior to movement of said center means from the operating position to the retracted position.

15. A machine tool as set forth in claim 14 wherein said turret drive means includes indexing means for rotating said turret means about an axis extending parallel to the central axis of the workpiece and to the main axis of said center means and traversing means for moving said turret means along a third path extending transversely to the central axis of the workpiece and to the main axis of said center means.

16. A machine tool as set forth in claim 14 further including pressure regulator means for controlling the force with which said center means is pressed against the one end portion of the workpiece when said center means is in the second position.

17. A machine tool as set forth in claim 14 wherein said support means includes arm means pivotally mounted on said carriage for rotation about an axis extending parallel to the central to the central axis of the workpiece and to the first path, said tailstock means further including means supporting said piston and cylinder means on said carriage means for rotation about an axis extending parallel to the axis of rotation of said arm means to thereby enable said arm means and piston and cylinder means to rotate relative to said carriage means upon operation of said piston and cylinder means to move said center means between the operating and retracted positions.

* * * * *